US006825425B2

(12) United States Patent
Perry

(10) Patent No.: US 6,825,425 B2
(45) Date of Patent: Nov. 30, 2004

(54) WEIGH SCALE WITH SUPPORT ARMS AND FOLD-AWAY SEAT

(75) Inventor: David Hal Perry, Webb City, MO (US)

(73) Assignee: Cardinal Scale Manufacturing Co., Webb City, MO (US)

( * ) Notice: Subject to any disclaimer, the term of this patent is extended or adjusted under 35 U.S.C. 154(b) by 79 days.

(21) Appl. No.: 10/269,902

(22) Filed: Oct. 10, 2002

(65) Prior Publication Data

US 2004/0069541 A1 Apr. 15, 2004

(51) Int. Cl.[7] ............................ G01G 19/52; A47C 4/00
(52) U.S. Cl. ...................... 177/126; 177/144; 297/16.1
(58) Field of Search ................................ 177/126, 127, 177/144; 297/13, 14, 15, 16.1

(56) References Cited

U.S. PATENT DOCUMENTS

| 1,465,529 | A | * | 8/1923 | Rumbaugh et al. ............ 297/14 |
| D149,161 | S | * | 4/1948 | Bond ........................... D6/368 |
| 4,013,135 | A | * | 3/1977 | Kechely ...................... 177/144 |
| 4,441,568 | A | | 4/1984 | Heffner ....................... 177/129 |
| 4,489,955 | A | * | 12/1984 | Hamilton ................. 280/250.1 |
| 4,527,828 | A | * | 7/1985 | Groce et al. ............. 296/65.09 |
| 4,527,829 | A | * | 7/1985 | Fanslau et al. ................ 297/17 |
| 5,185,892 | A | * | 2/1993 | Mitchell ...................... 4/578.1 |
| 5,319,817 | A | * | 6/1994 | Hay et al. ........................ 5/611 |
| 5,335,963 | A | * | 8/1994 | Muller et al. ................ 297/244 |
| 5,448,022 | A | | 9/1995 | Rishel ......................... 177/126 |
| 5,511,571 | A | * | 4/1996 | Adrezin et al. ................ 135/66 |
| 5,612,515 | A | * | 3/1997 | Eisen .......................... 177/126 |
| 5,892,180 | A | | 4/1999 | Carey .......................... 177/144 |
| 6,201,195 | B1 | | 3/2001 | Carey .......................... 177/144 |
| 6,268,572 | B1 | | 7/2001 | Wilson, Jr. .................. 177/126 |
| 6,403,897 | B1 | * | 6/2002 | Bluth et al. ................. 177/144 |
| 6,441,323 | B1 | * | 8/2002 | Montagnino et al. ....... 177/126 |

\* cited by examiner

Primary Examiner—Randy W. Gibson
(74) Attorney, Agent, or Firm—Hovey Williams LLP

(57) ABSTRACT

A weigh scale is disclosed for facilitating the weighing of obese users, handicapped users, elderly users, and others who have difficulty supporting themselves by giving a user the option of standing or sitting while being weighed. The weigh scale broadly comprises a platform, having at least one load sensor coupled thereto, large enough to allow a user to comfortably step onto it and position himself or herself to be weighed, an upright support structure secured to the platform so that the user may steady himself or herself while being weighed, a fold-away seat secured to the support structure so that the user may sit while being weighed, and a display for displaying the weight measured.

22 Claims, 2 Drawing Sheets

WEIGH SCALE WITH SUPPORT ARMS AND FOLD-AWAY SEAT

BACKGROUND OF THE INVENTION

1. Field of the Invention

The present invention relates to weigh scales. More particularly, the present invention relates to a weigh scale having a support structure and a fold-away seat to facilitate the weighing of obese persons, handicapped persons, elderly persons, and others who have difficulty supporting themselves.

2. Description of Prior Art

Many types and varieties of weigh scales exist for assisting or supporting users who are unable to stand without difficulty. Many facilities, such as hospitals, nursing homes, and doctors' offices, often use such weigh scales to weigh obese persons, handicapped persons, elderly persons, and others who have difficulty supporting themselves.

Prior art designs of weigh scales vary from allowing users to stand to completely lifting users by a hoist. For example, one prior art design provides a small support arm that may be secured to one side of an upright scale, such as the type commonly found in doctors' offices. A user may stand on the scale and steady himself or herself using the support arm. However, the user does not have the option of sitting while being weighed since there is no seat secured to the weigh scale.

Another design allows a wheelchair to be rolled onto a platform of a weigh scale. The weigh scale is not designed to allow a user to stand on the platform nor does the weigh scale provide support arms.

Another design is a hoist and weigh scale combination that suspends a user to be weighed. A sling is placed around the user and secured to a mast of the weigh scale. The user is then lifted and weighed. The device is cumbersome to use and requires a second person to operate a motor controlled elevation arm.

Another design includes a weigh scale having a chair on which the user can sit while being weighed. However, all of the user's weight must be on the chair to obtain an accurate measured weight, which requires the user to lift his or her legs. The weigh scale is not designed with a support rail, nor does it provide the user an option to stand.

Accordingly, there is a need for a weigh scale that overcomes the limitations of the prior art. Specifically, there is a need for a weigh scale that supports a user who has difficulty standing and that gives the user the option of standing or sitting while being weighed.

SUMMARY OF THE INVENTION

The weigh scale of the present invention overcomes the above-identified problems and provides a distinct advance in the art of weigh scales. More particularly, the present invention provides a weigh scale that facilitates the weighing of obese users, handicapped users, elderly users and others who have difficulty supporting themselves by giving a user an option of standing or sitting while being weighed.

The preferred embodiment of the weigh scale broadly comprises a platform, a support structure, a fold-away seat, and an electronic display. The platform is preferably large enough so that the user can comfortably step onto the platform, turn around, and move laterally. At least one load sensor is positioned within the platform for measuring the user's weight. An upright support structure is preferably secured to the platform and is tall enough so that the user can grasp the support structure for support or can lean against it without having to bend down. The support structure is preferably stable so that it does not sway when the user leans onto it.

The fold-away seat is preferably pivotally connected to the support structure and can be alternately placed in a down or an up position so that the user may sit or stand while being weighed. The seat is preferably wide enough to accommodate various sized users, and the support structure is still within reach when the user is sitting so that the user may steady himself or herself.

An electronic display is preferably mounted to the support structure such that the user may read the weight measured, or a second person, such as a nurse or a personal care attendant, may stand outside of the support structure and read the weight measured.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
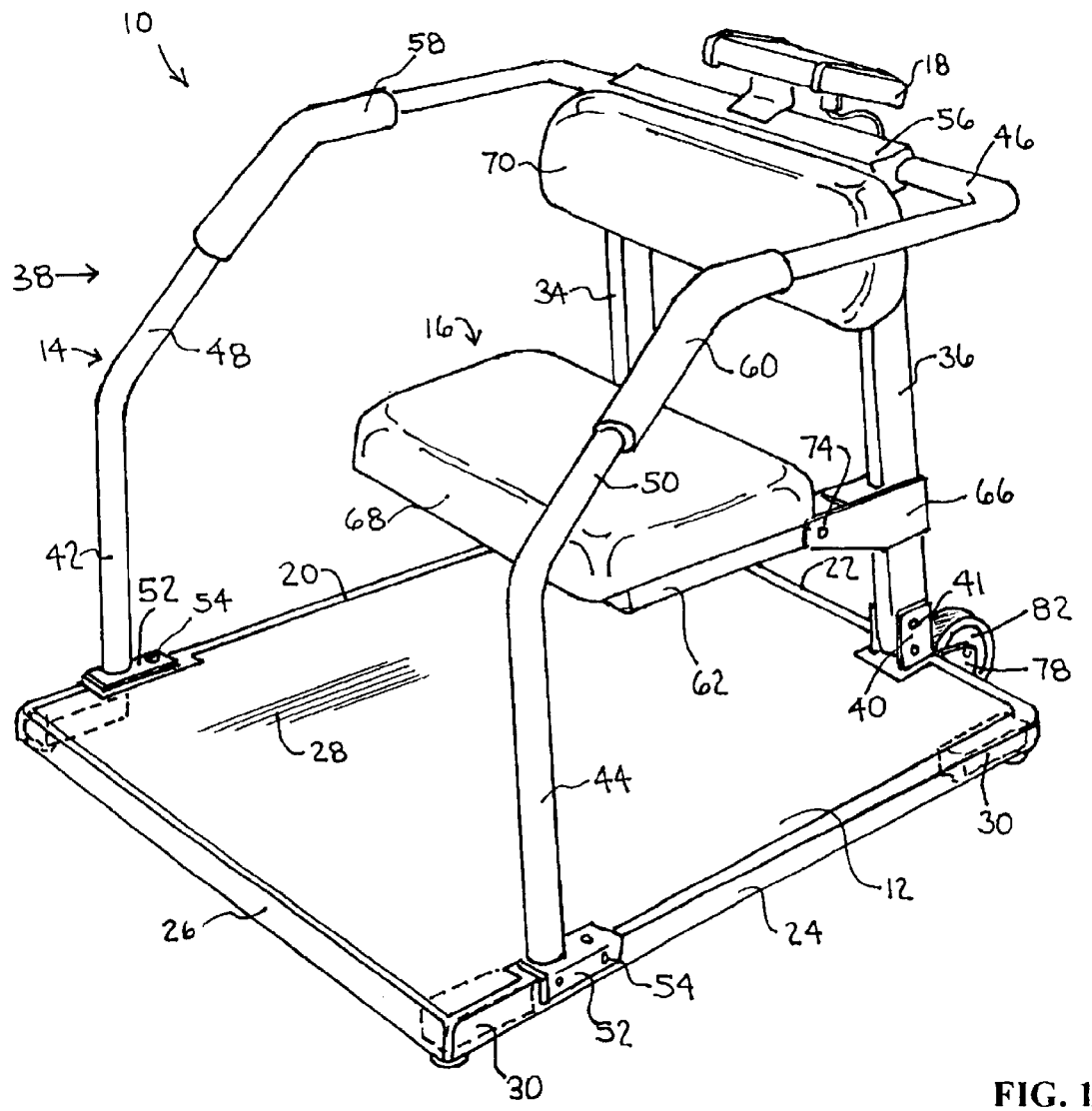
FIG. 1 is a perspective view of a weigh scale constructed in accordance with a preferred embodiment of the present invention and showing a fold-away seat in a down position.
Figure 2:
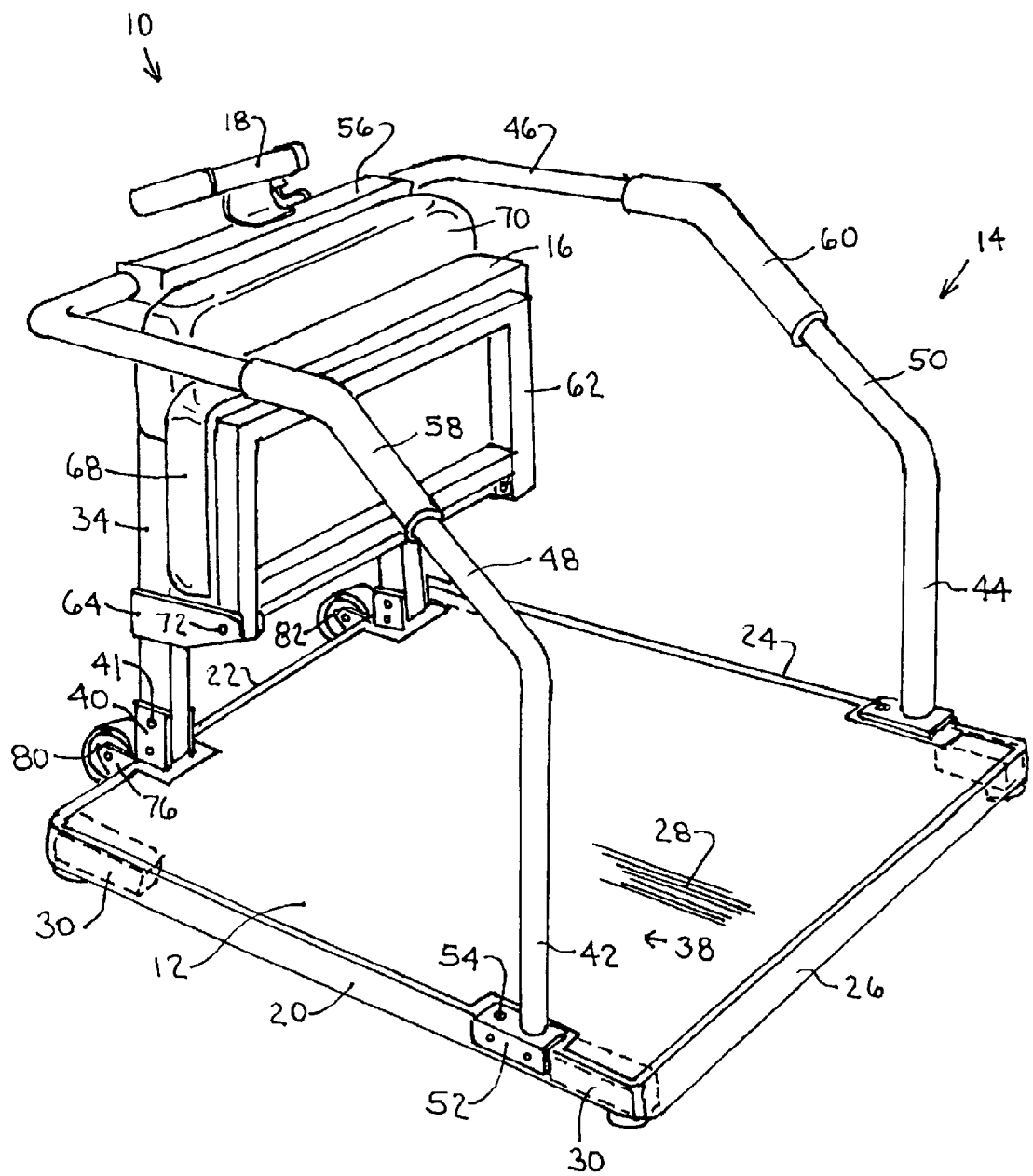
FIG. 2 is a perspective view of the weigh scale showing the fold-away seat in an up position.

Referring to FIGS. 1 and 2, a weigh scale 10 constructed in accordance with a preferred embodiment of the present invention is illustrated. It can be seen that the weigh scale 10 is well-suited for weighing obese users, handicapped users, elderly users, and others who have difficulty supporting themselves in a standing or a sitting position. The weigh scale 10 broadly comprises a platform 12, a support structure 14, a fold-away seat 16, and an electronic display 18.

The platform 12 is preferably rectangular in shape and has a first side 20, a second side 22, a third side 24, and a fourth side 26. The first side 20 and the third side 24 are preferably approximately three feet in length, but the length may range between one foot and seven feet. The second side 22 and the fourth side 26 are preferably approximately three feet in width, but the width may range between one foot and seven feet. The platform 12 is preferably approximately four inches in height, but the height may range between one inch and twelve inches.

The platform 12 is preferably constructed of stainless steel but may be constructed of other rigid materials. The platform 12 is preferably covered with a non-skid material 28, such as a rubber mat or other similar material, and is capable of supporting loads in excess of five hundred pounds. One or more electronic load sensor(s) 30 are preferably positioned within the platform 12 for measuring the user's weight. Preferably, the load sensor(s) 30 are a load cell using any mechanical or electrical scale, such as a transducer, a strain gauge, or a spring. The load sensor(s) 30 are preferably substantially positioned at each corner of the rectangular platform 12 such that the user may stand on or sit anywhere above the platform without adversely affecting the load measured.

The support structure 14 extends upwardly from the top of the platform 12 and substantially encloses three sides of the platform 12. The support structure 14 is preferably bolted, welded, or otherwise secured to the platform 12 and extends approximately four feet above the platform 12, but the height may range between two feet and six feet. The support structure 14 is preferably made of stainless steel, but other suitable materials may be used, such as mild steel or aluminum.

The support structure 14 comprises a first vertical member 34, a second vertical member 36, and a rail 38. A first end of the first vertical member 34 is preferably secured to the second side 22 of the platform 12 approximately six inches from a corner where the first side 20 and the second side 22 of the platform 12 meet. Similarly, a first end of the second vertical member 36 is preferably secured to the second side 22 of the platform 12 approximately six inches from a corner where the second side 22 and the third side 24 of the platform 12 meet. Both the first and second vertical members 34,36 are preferably rectangular in cross-section, but the cross-section may be other shapes, such as square or circular. The rectangular cross-section of the first and second vertical members 34,36 has a length of approximately three inches and a width of approximately one inch, but the length may range between one inch and five inches, and the width may range between one-half inch and two inches.

The first and second vertical members 34,36 are preferably secured to the second side 22 of the platform 12 using brackets 40 permanently secured to the platform 12. The first and second vertical members 34,36 are then inserted into a respective bracket 40 and secured with at least one bolt 41, but preferably two bolts. The first and second vertical members 34,36 are preferably secured to the platform 12 in such a manner that with the rail 38 removed, the first and second vertical members 34,36 may fold substantially flat against the platform 12 so as to reduce the height of the weigh scale 10 to facilitate shipment or storage.

The rail 38 comprises a first and a second vertical portion 42,44, a substantially U-shaped horizontal portion 46, and a first and a second diagonal portion 48,50. The first and second vertical portions 42,44, the U-shaped portion 46, and the first and second diagonal portions 48,50 are preferably circular in cross-section with a diameter of approximately three inches, but the diameter may range between one inch and six inches. Additionally, the cross-section may be other shapes, such as square.

The first vertical portion 42 of the rail 38 is secured to the first side 20 of the platform 12, preferably approximately six inches from the fourth side 26 of the platform 12. Similarly, the second vertical portion 44 of the rail 38 is secured to the third side 24 of the platform 12, preferably approximately six inches from the fourth side 26 of the platform 12. The first and second vertical portions 42,44 are each secured to the platform 12 using brackets 52 permanently molded to the first and second vertical portions 42,44 and formed at a substantially right angle. Each bracket 52 is then secured to the platform 12 using at least one screw 54, but preferably three screws.

The U-shaped horizontal portion 46 is substantially positioned above the first, second, and third sides 20,22,24 of the platform 12. The U-shaped portion 46 is secured to the first and second vertical members 34,36 using a retaining bracket 56, which is permanently molded to the U-shaped portion 46. The retaining bracket 56 is positioned above the first and second vertical members 34,36 and secured to the members 34,36 using a plurality of screws.

The first and second diagonal portions 48,50 are preferably connected to the first and second vertical portions 42,44 and the U-shaped horizontal portion 46 such that a first end of the first diagonal portion 48 is connected to a first end of the first vertical portion 42 at an approximately 135° angle, and a second end of the first diagonal portion 48 is connected to the U-shaped horizontal portion 46 at an approximately 135° angle. Similarly, a first end of the second diagonal portion 50 is connected to a first end of the second vertical portion 44 at an approximately 135° angle, and a second end of the second diagonal portion 50 is connected to the U-shaped horizontal portion 46 at an approximately 135° angle. In combination, the first vertical portion 42, the first diagonal portion 48, the U-shaped horizontal portion 46, the second diagonal portion 50, and the second vertical portion 44 preferably comprise one continuous piece. Alternatively, the first and second diagonal portions 48,50 may be removed, and the first and second vertical portions 42,44 may be connected to the U-shaped horizontal portion 46 at a substantially 90° angle.

The rail 38 is preferably provided with a first and a second padded grip 58,60 for the comfort of the user and to prevent the user's hands from slipping on the rail 38. The padded grips 58,60 are preferably a soft, flexible rubber or foam tubing. The first padded grip 58 is preferably positioned on an upper segment of the first diagonal portion 48 and a segment of the U-shaped horizontal rail 46. Similarly, the second padded grip 60 is preferably positioned on an upper segment of the second diagonal portion 50 and a segment of the U-shaped horizontal rail 46.

The fold-away seat 16 comprises a U-shaped frame 62, a first and a second hinge bracket 64,66, a seat pad 68, and a seat back 70. The frame 62 is preferably made of tubing approximately one inch in width and length, but the width and length may range between one-half inch and four inches. Additionally, although the frame 62 is preferably U-shaped, the frame 62 may be other shapes, such as square. The frame 62 is preferably comprised of stainless steel, but other suitable materials may be used, such as mild steel or aluminum.

The first and second hinge brackets 64,66 are preferably rigidly attached to the first and second vertical members 34,36, respectively, at a height approximately sixteen inches from the platform 12, but the height may range between twelve inches and thirty-six inches. The height positions the fold-away seat 16 such that the user can comfortably sit on the fold-away seat 16. A first end of the frame 62 is pivotally connected to the first hinge bracket 64 using a first hinge pin 72. Similarly, a second end of the frame 62 is pivotally connected to the second hinge bracket 66 using a second hinge pin 74. The hinge brackets 64,66 may include springs to bias the foldaway seat 16 in either a down position, as illustrated in FIG. 1, or in an up position, as illustrated in FIG. 2.

The seat pad 68 is preferably comprised of a foam interior for cushioning and a vinyl outer surface, but other suitable materials, such as leather, may be used. The seat pad 68 is preferably secured to an upper side of the frame 62 using a plurality of screws. The seat back 70 is preferably secured to an upper portion of the first and second vertical members 34,36 such that when the user sits on the fold-away seat 16, the user may place his or her back against the seat back 70 for cushioning. Similar to the seat pad 68, the seat back 70 is preferably comprised of a foam interior for cushioning and a vinyl outer surface, but other suitable materials, such as leather, may be used.

The electronic display 18 is preferably pivotally secured to the retaining bracket 56 at approximately the bracket's midlength. The electronic display 18 is operable to be viewed by the user being weighed or by another person standing outside the weigh scale 10, such as a nurse or personal care attendant. The electronic display 18 is electronically connected to the load sensor(s) 30 for displaying the weight measured by the load sensor(s) 30.

A first wheel mount 76 is attached to the second side 22 of the platform 12 near the junction where the first vertical member 34 and the platform 12 meet. Similarly, a second wheel mount 78 is attached to the second side 22 of the platform 12 near the junction where the second vertical member 36 and the platform 12 meet. A first wheel 80 is connected to the first wheel mount 76, and a second wheel 82 is connected to the second wheel mount 78. The wheels 80,82 contact the floor as an operator of the weigh scale 10 tilts the weigh scale 10 back by pulling on the U-shaped horizontal portion 46, thus allowing the weigh scale 10 to be transported to another location.

From the preceding description, it can be seen that the weigh scale 10 of the present invention allows for more convenient, safe, and user-friendly weighing of obese persons, handicapped persons, elderly persons, and others who have difficulty supporting themselves. Although the invention has been described with reference to the preferred embodiment illustrated in the attached drawings, equivalents may be employed and substitutions made herein without departing from the scope of the invention as recited in the claims. For example, the platform 12 may be differently shaped, such as circular or trapezoidal. The support structure 14 may be differently shaped or may enclose fewer or more sides of the platform 12.

Having thus described the preferred embodiment of the invention, what is claimed as new and desired to be protected by Letters Patent includes the following:

1. A weigh scale for weighing a user while the user is sitting or standing, the weigh scale comprising:
   a platform having first, second, third, and fourth sides and including at least one load sensor coupled to the platform;
   an upright support structure secured to the platform and enclosing a majority of a perimeter of the platform, including the second side of the platform;
   a fold-away seat secured to only the portion of the support structure enclosing the second side of the platform; and
   a display for displaying a weight measured by the load sensor(s).

2. The weigh scale of claim 1, wherein the platform is rectangular in shape, between one foot and seven feet long, and between one foot and seven feet wide.

3. The weigh scale of claim 2, wherein the support structure substantially encloses a first, a second, and a third side of the platform and rises a height between two feet and six feet above the platform.

4. The weigh scale of claim 3, wherein the support structure includes a first and a second vertical member both secured to the second side of the platform.

5. The weigh scale of claim 4, wherein the support structure includes a rail comprising:
   a first and a second vertical portion;
   a first and a second diagonal portion; and
   a substantially U-shaped horizontal portion positioned above the first, second, and third sides of the platform.

6. The weigh scale of claim 5, wherein the first vertical portion is secured to the first side of the platform, and the second vertical portion is secured to the third side of the platform.

7. The weigh scale of claim 6, wherein a first end of the first diagonal portion is connected to a first end of the first vertical portion at a substantially 135° angle, and a second end of the first diagonal portion is connected to the U-shaped horizontal portion at a substantially 135° angle, and a first end of the second diagonal portion is connected to a first end of the second vertical portion at a substantially 135° angle, and a second end of the second diagonal portion is connected to the U-shaped horizontal portion at a substantially 135° angle.

8. The weigh scale of claim 7, wherein the first vertical portion, the first diagonal portion, the U-shaped horizontal rail, the second diagonal portion, and the second vertical portion substantially comprise one continuous piece.

9. The weigh scale of claim 8, wherein a first padded grip is positioned around an upper segment of the first diagonal portion and a segment of the U-shaped horizontal rail, and a second padded grip is positioned around an upper segment of the second diagonal portion and a segment of the U-shaped horizontal rail.

10. The weigh scale of claim 9, wherein the rail is secured to the first and the second vertical members using a retaining bracket and a plurality of screws.

11. The weigh scale of claim 10, wherein the fold-away seat is pivotally secured to the first and the second vertical members for placement of the seat in an up or a down position.

12. The weigh scale of claim 11, wherein a seat back is secured to the first and the second vertical members.

13. The weigh scale of claim 12, wherein the display is pivotally secured to the retaining bracket.

14. The weigh scale of claim 13, wherein at least one wheel is mounted to the platform for facilitating movement of the weigh scale.

15. A weigh scale for weighing a user while the user is sitting or standing, the weigh scale comprising:
   a platform having at least one load sensor coupled thereto and also having an area;
   an upright support structure secured to the platform;
   a fold-away seat pivotally secured to the support structure and having an area, wherein the area of the platform is approximately at least one and one-half times larger than the area of the seat, such that the user may move about on the platform while being weighed; and
   a display operable to display a weight measured by the load sensor(s).

16. The weigh scale of claim 15, wherein the support structure rises a height between two feet and six feet above the platform.

17. The weigh scale of claim 15, wherein the support structure includes a first and a second vertical member secured to the platform.

18. The weigh scale of claim 15, wherein the fold-away seat is operable to fold up towards the first and the second vertical members allowing the user to stand while being weighed.

19. The weigh scale of claim 15, wherein the display is pivotally secured to the support structure, and the display electronically displays the weight.

20. A weigh scale for weighing a user while the user is sitting or standing, the weigh scale comprising:
   a rectangular planar platform having a first and a third side with a length, a second and a fourth side with a width, and at least one load sensor coupled thereto;
   a support structure secured to the platform, rising to a height above the platform, and enclosing the first, second, and third sides of the platform, the support structure including a first and a second vertical member secured to the second side of the platform, and a rail including a first vertical portion secured to the first side of the platform, a second vertical portion secured to the third side of the platform, a substantially U-shaped horizontal portion positioned above the first, second, and third sides of the platform and secured to the two vertical members, and a first and a second diagonal portion, wherein a first end of the first diagonal portion is connected to a first end of the first vertical portion at a substantially 135° angle, and a second end of the first diagonal portion is connected to the U-shaped horizontal rail at a substantially 135° angle, and a first end of the second diagonal portion is connected to a first end of the second vertical portion at a substantially 135° angle, and a second end of the second diagonal portion is connected to the U-shaped horizontal rail at a substantially 135° angle such that the first and second diagonal portions have a length sufficient to allow a user to grip the diagonal portions;

a fold-away seat pivotally secured to the first and the second vertical members for positioning the seat in an up or a down position; and an electronic display mounted to the support structure for displaying the weight measured by the load sensor(s).

21. A weigh scale for weighing a user while the user is sitting or standing, the weigh scale comprising:

a platform having at least one load sensor coupled thereto;

an upright support structure secured to the platform;

a fold-away, legless seat secured to the support structure; and a display for displaying a weight measured by the load sensor(s).

22. A weigh scale for weighing a user while the user is sitting or standing, the weigh scale comprising:

a platform having at least one load sensor coupled thereto and including first, second, third, and fourth sides;

an upright support structure secured to the platform and including side rails positioned generally at the first and third sides of the platform;

a fold-away seat pivotally secured to the support structure, such that when the seat is positioned in an up position, the side rails remain in place to allow the user to grasp the side rails while being weighed; and a display operable to display a weight measured by the load sensor(s).

* * * * *